United States Patent
Hartelius

(10) Patent No.: US 9,380,764 B1
(45) Date of Patent: Jul. 5, 2016

(54) DOG SOUNDING TOY

(71) Applicant: Mark Hartelius, Chicago, IL (US)

(72) Inventor: Mark Hartelius, Chicago, IL (US)

(*) Notice: Subject to any disclaimer, the term of this patent is extended or adjusted under 35 U.S.C. 154(b) by 0 days.

(21) Appl. No.: 14/751,292

(22) Filed: Jun. 26, 2015

Related U.S. Application Data

(63) Continuation-in-part of application No. 14/189,827, filed on Feb. 25, 2014, now Pat. No. 9,108,705.

(60) Provisional application No. 61/770,478, filed on Feb. 28, 2013.

(51) Int. Cl.
*B63B 35/73* (2006.01)
*A01K 11/00* (2006.01)

(52) U.S. Cl.
CPC .................................. *A01K 15/026* (2013.01)

(58) Field of Classification Search
CPC ........................................................ B63B 35/73
USPC ........................................................ 441/129
See application file for complete search history.

(56) References Cited

U.S. PATENT DOCUMENTS

| | | | | |
|---|---|---|---|---|
| 4,424,043 A * | 1/1984 | Behl | ............ | B63C 9/08 441/81 |
| 5,628,658 A * | 5/1997 | Clifford | ............ | A47C 15/006 441/130 |
| 5,947,782 A * | 9/1999 | Siladke | ............ | B63B 35/73 440/6 |
| D421,085 S * | 2/2000 | Fife | ............ | B63B 35/78 D21/801 |
| 6,199,676 B1 * | 3/2001 | Targiroff | ............ | B64D 25/14 156/322 |
| 6,276,979 B1 * | 8/2001 | Saltel | ............ | B63B 35/78 441/132 |
| 6,749,475 B2 * | 6/2004 | Howerton | ............ | B63B 35/78 114/345 |
| 7,008,281 B2 * | 3/2006 | Ketko | ............ | A47C 15/006 297/250.1 |
| 7,798,879 B2 * | 9/2010 | James | ............ | B63C 9/135 441/118 |
| 8,147,286 B2 * | 4/2012 | Messina | ............ | B63C 9/135 441/80 |
| 8,651,909 B2 * | 2/2014 | Romzek | ............ | B63B 35/73 114/219 |
| 2005/0026520 A1 * | 2/2005 | Howerton | ............ | B63B 35/78 441/132 |
| 2005/0106963 A1 * | 5/2005 | Ross | ............ | B63B 35/78 441/129 |
| 2014/0364024 A1 * | 12/2014 | Hartelius | ............ | B63B 35/73 441/129 |

OTHER PUBLICATIONS

Floating canvas roll Pillow—believed prior art www.PoolFloatSmart.com, Dec. 6, 2010.

* cited by examiner

*Primary Examiner* — Lars A Olson
*Assistant Examiner* — Jovon Hayes
(74) *Attorney, Agent, or Firm* — Robert W J. Usher

(57) ABSTRACT

An amusement device for humans or pets has an elongate, semi-rigid, floating tube assembly with an outer, sleeve-forming tube of soft, flexible, buoyant material and semi-rigid, modular, inner tubing inserted longitudinally into the sleeve. The inner tubing is assembled from a series of identical, rigid, tubular, plastic links each having ball and a socket joint at respective opposite ends rotatively engaged with respective socket and ball joints of adjacent links. The engaging/abutting surfaces of the joints form interference, watertight fits to join the links in end-to-end relation to any desired length and enabling the tube assembly to be transversely bent by a person into different stable shapes. A creaking sound, audible to a user or pet, such as a dog, is emitted during rotative movement of the joints during transverse bending of the tube assembly. A bite/chew resistant outer skin/layer covers the outer tube.

13 Claims, 5 Drawing Sheets

DOG SOUNDING TOY

RELATED APPLICATION

This is a continuation-in-part application of Ser. No. 14/189,827, filed Feb. 25, 2014, the disclosure of which is incorporated herein by reference.
Priority is claimed from my U.S. provisional application 61/770,478, filed Feb. 28, 2013, the disclosure of which is incorporated herein by reference.

FIELD OF THE INVENTION

The invention relates to amusement devices comprising sounding toys for humans or pets such as dogs.

BACKGROUND OF THE INVENTION

An amusing sounding toy comprising a floating tube assembly which includes an outer, flexible tube containing an inner, sound producing element, formed by semi-rigid tubing which emits a creaking noise during bending between different shapes and audible to the bender, is described in my parent application referred to above.

SUMMARY OF THE INVENTION

It is an object of the invention to provide a pet dog sounding toy which emits a creaking noise during bending between different shapes by shaking or possibly chewing by a dog.

More specifically, a dog sounding toy according to the invention comprises an elongate assembly comprising an outer, sleeve-forming tube of cushioning material and modular, semi-rigid, inner tubing inserted longitudinally into the sleeve and comprising a series of identical, rigid, tubular, plastic links having respective opposite ends provided respectively with ball and a socket joints rotatively engaged with respective socket and a ball joints of adjacent links with engaging/abutting surfaces in interference, watertight fits to join the links in end-to-end relation enabling the tube assembly to be transversely bent by a dog during chewing or shaking behaviour such that a creaking sound, audible to the dog, is emitted by rotative movement of the joints during transverse bending of the tube assembly.

The creaking sound produced by the dog's own actions stimulates the dog causing great playfulness and apparent enjoyment.

Preferably, the ball and socket joints of each link are joined by a narrow neck portion.

The outer tube cushioning material may comprise a closed cell foam and may be covered by a protective outer layer of dog bite resistant material, preferably a plush fabric such as a polyester valboa.

Alternatively, the outer tubing may be made of a rubber, TPR or TPE or similar bendable cushioning material, preferably formed/molded in an elongate bone shape with the armature received as a loose (free fit) in the central passageway thereof to permit unencumbered bending of the armature.

The invention includes a kit for making the dog toy.

BRIEF DESCRIPTION OF THE DRAWINGS

In order that the invention may be readily understood, particular embodiments thereof will now be described with reference to the accompanying drawings in which.

PARTICULAR DESCRIPTION

Figure 1:
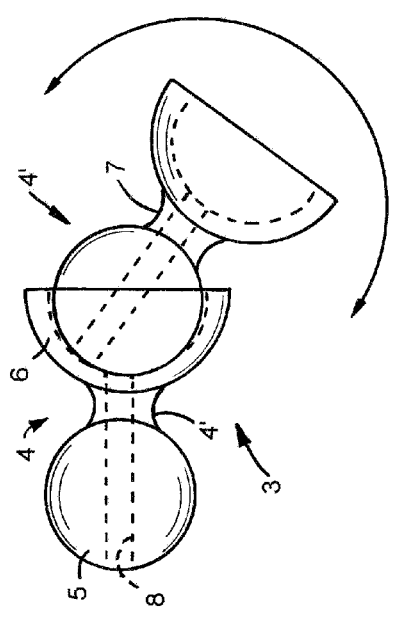
FIG. 1 is a schematic view showing two links of inner tubing of a sound producing, floating tube assembly joined together for relative rotation.
Figure 2:
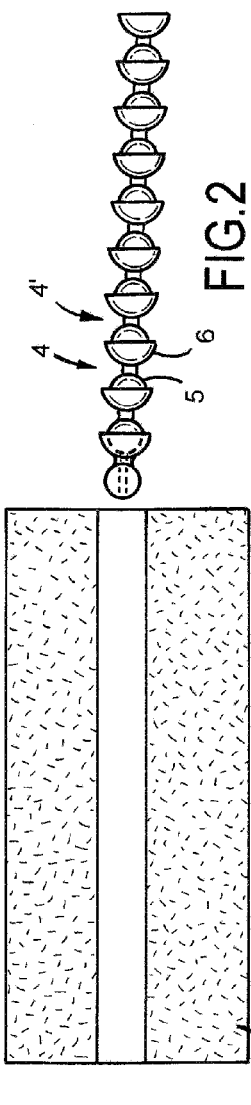
FIG. 2 is view is a longitudinal cross-sectional view of the outer, sleeve-forming tube of the sound producing, floating tube assembly and inner tubing aligned for longitudinal insertion therein.
Figure 3:
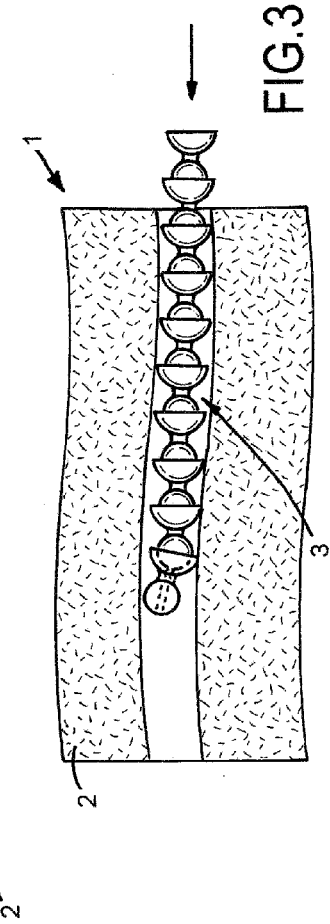
FIG. 3 is a similar view to FIG. 3 with the inner tubing partly inserted.

Referring to FIGS. 1-3, an amusement device comprising an elongate, semi-rigid, floating tube assembly 1 comprises an outer sleeve-forming tube 2 of soft, flexible, buoyant material, being a closed cell EPE foam, (preferably, non-phthalate) and modular, semi-rigid, inner tubing 3 insertable longitudinally into the outer tube 2. The inner tubing 3 (armature) comprises a series of identical, tubular rigid, plastic links 4, 4' each having opposite ends provided respectively with a ball 5 and a socket joint 6 joined together by a neck portion 7, rotatively engaged with socket and ball joints of adjacent links with respective abutting/engaging surface portions of the joints in interference, watertight fits, to join the links 4, 4' in end to end relation, enabling the tube assembly 1 to be transversely bent by a person into different stable shapes. Each link has a bore/duct 8 extending axially/longitudinally therethrough.

The armature structure is prior art, being a known type of semi-rigid conduit/piping for feeding lubricant to a manufacturing machine.

During relative movement, (as when transversely bending the tube assembly), the engaged joints emit a creaking sound audible to a user.

The inner modular tubing can be retained in the sleeve as an interference/friction fit or retained therein by optional end plugs/caps. The individual links can be snap-fitted together to provide semi-rigid inner tubing of any desired length.

Ends of the sleeve assemble can be sealed using a silicone or bonding agent.

The ability for children to manually deform the assembly into any desired stable shape provides considerable amusement both in and out of the water, which is increased by the 'creaking bones' noise produce by their bending actions.

The modular nature of the inner tubing enables bent assemblies to be joined together for enormous variations of lengths and shapes, forming, for example, a diving ring for a swimming pool or, completely wrapping around a person as a floatation aid.

Figure 4:
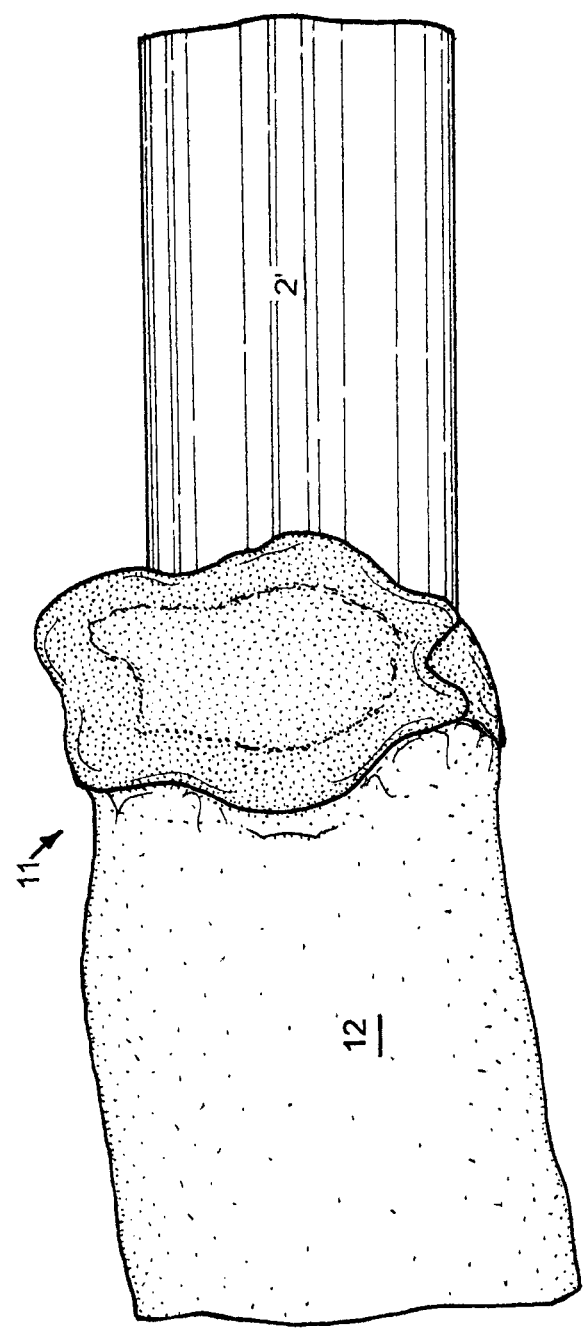
FIG. 4 is a photograph of another embodiment of a sound producing dog toy showing the outer, foam tube for containing the sound producing armature partly covered by a plush fabric, sufficiently durable to resist, (retard), within limits destruction by dog chewing or biting.
Figure 5:
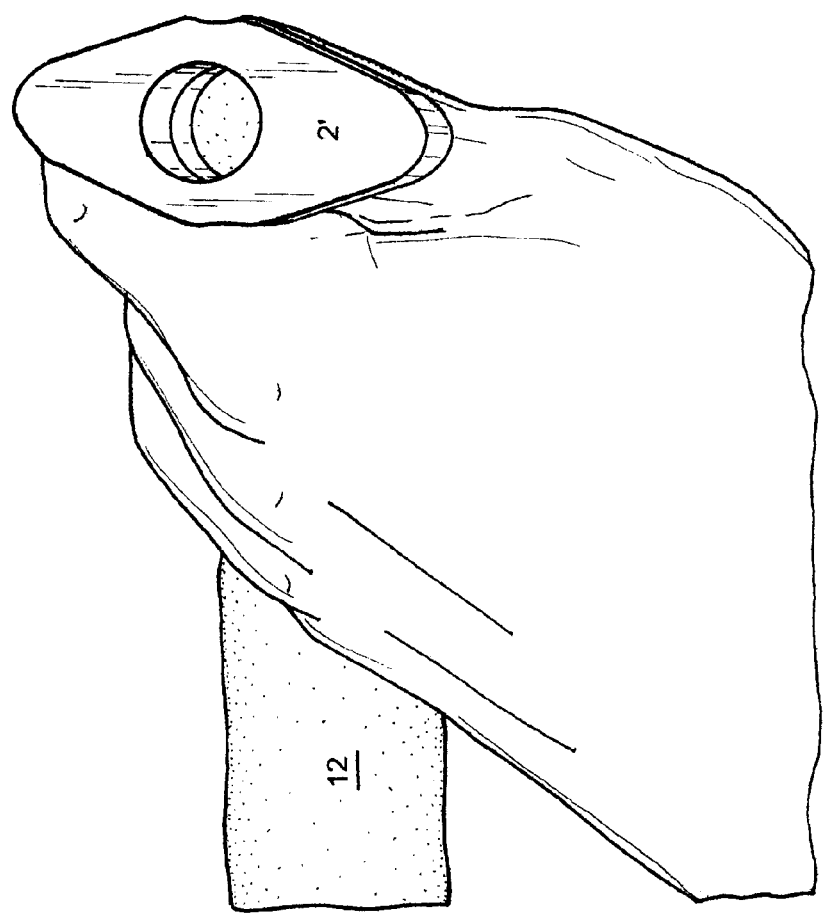
FIG. 5 is a photograph of the exposed end of the outer foam tubing held by a hand.
Figure 6:
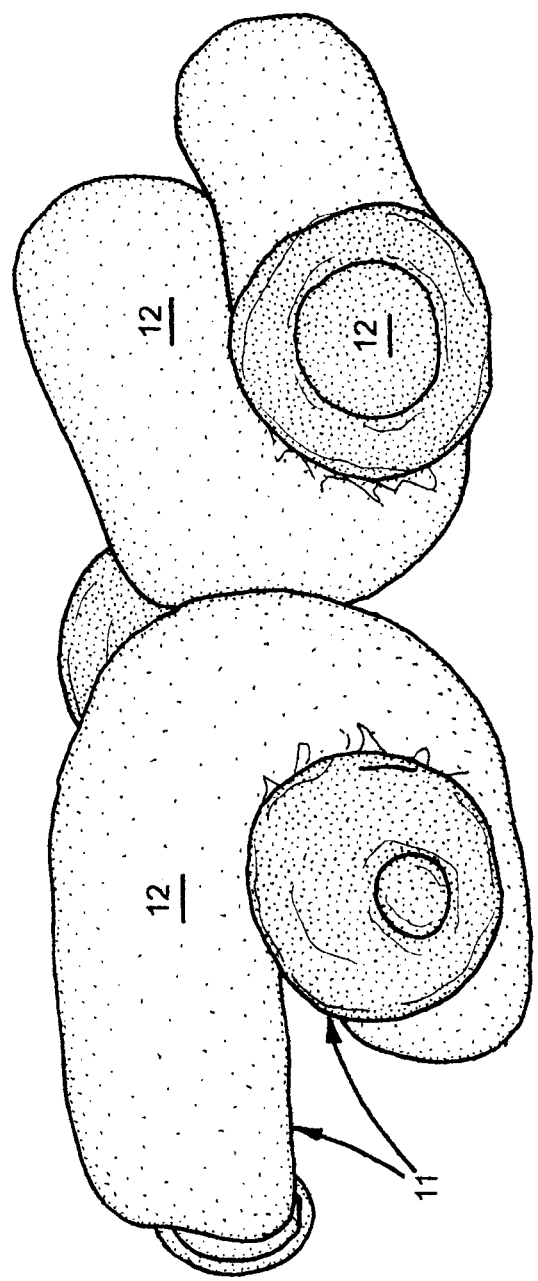
FIG. 6 is a photograph of three dog sounding toys with respective plush fabric outer layers or coverings and bent into inter-engaging loops.

In the dog sounding embodiment 11 of FIGS. 4 to 6, the outer tubing 2' is covered by a bite resistant layer 12 of plush fabric.

Figures 7A, 7B:
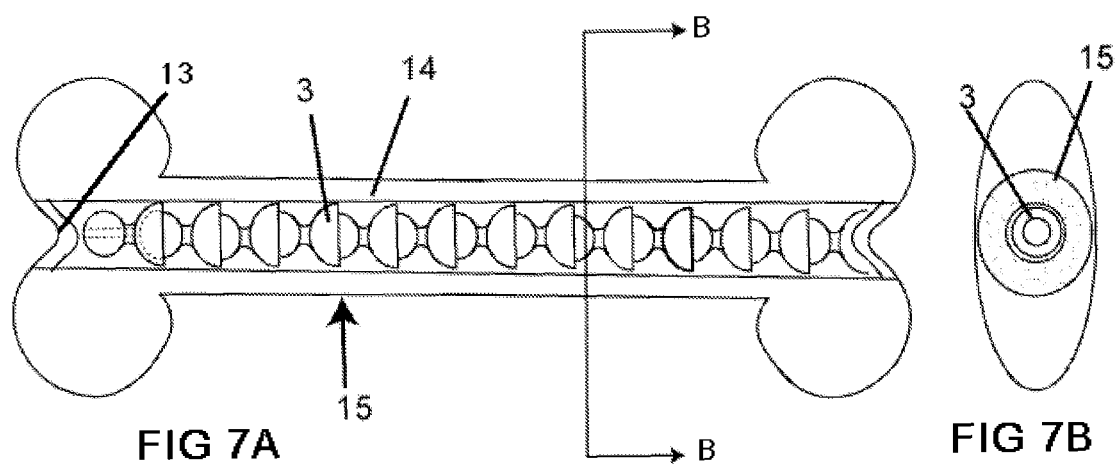
FIG. 7A is a schematic, longitudinal cross-sectional view of another dog sounding toy in the shape of a bone.
FIG. 7B is a schematic, transverse cross sectional view along line B-B of FIG. 7A.

In the embodiment of FIGS. 7A and 7B, the sound producing armature 3 is received as a free (loose) fit in an elongate central passageway 14 in a tube of suitable rubber or resiliently flexible plastic material such as TPR or TPE or other suitable bendable material formed in the iconic shape of a dog bone 15. Opposite longitudinal ends of the passageway are sealed by glued-in end plugs 13.

The invention claimed is:

1. A dog toy comprising an elongate assembly comprising an outer, sleeve-forming tube of cushioning material and modular, semi-rigid, inner tubing inserted longitudinally into the sleeve and comprising a series of identical, rigid, tubular, plastic links having respective opposite ends provided respectively with ball and a socket joints rotatively engaged with respective socket and a ball joints of adjacent links with engaging/abutting surfaces in interference, watertight fits to join the links in end-to-end relation enabling the tube assembly to be transversely bent by a dog during chewing or shaking behavior such that a creaking sound, audible to the dog, is emitted by rotative movement of the joints during transverse bending of the tube assembly.

2. A dog toy according to claim 1, wherein the ball and socket joints of each link are joined by a narrow neck portion.

3. A dog toy according to claim 2, wherein the outer tube cushioning material comprises a closed cell foam.

4. A dog toy according to claim 1, wherein the cushioning material is covered by a protective outer layer of dog bite resistant material.

5. A dog toy according to claim 3, wherein the cushioning material is covered by a protective outer layer of dog bite resistant material.

6. A dog toy according to claim 4 wherein the dog bite resistant material is a plush fabric.

7. A dog toy according to claim 5, wherein the dog bite resistant material is a plush fabric.

8. A kit for making a dog toy comprising an outer tube of cushioning material and modular, semi-rigid, inner tubing insertable longitudinally into the outer tube and comprising a series of identical, tubular rigid, plastic links having respective opposite ends provided respectively with ball and socket joints rotatively engaged with socket and ball joints of adjacent links with engaging/abutting surfaces in interference, watertight fits, to join the links in end to end relation enabling the tube assembly to be transversely bent by a dog during chewing or shaking such that a creaking sound, audible to the dog, is emitted by rotative movement of the joints during transverse bending of the tube assembly.

9. A kit according to claim 6 wherein the outer tube cushioning material comprises a closed cell foam.

10. A kit according to claim 6 including a protective outer layer for the cushioning material comprising a dog bite resistant material.

11. A kit according to claim 6 wherein the ball and socket joints of each link are joined by a narrow neck portion.

12. A kit according to claim 8, wherein the dog bite resistant material is a plush fabric.

13. A sounding toy comprising an elongate assembly comprising an outer, sleeve-forming tube of cushioning material enclosing modular, semi-rigid, inner tubing which comprises a series of identical, rigid, tubular, plastic links having respective opposite ends provided respectively with ball and a socket joints rotatively engaged with respective socket and a ball joints of adjacent links with engaging/abutting surfaces in interference, watertight fits to join the links in end-to-end relation enabling the tube assembly to be transversely bent by a user such that a creaking sound, audible to the user is emitted by rotative movement of the joints during transverse bending of the tube assembly.

\* \* \* \* \*